US008635806B2

(12) United States Patent  
Gardner, Jr. et al.

(10) Patent No.: US 8,635,806 B2
(45) Date of Patent: *Jan. 28, 2014

(54) METHOD AND APPARATUS FOR AUTOMATIC PEST TRAP REPORT GENERATION AND ADDITIONAL TRAP PARAMETER DATA

(75) Inventors: James P. Gardner, Jr., Stillwater, MN (US); Stephen X. Skaff, Owatonna, MN (US); Kraig S. Lund, Longmont, CO (US); David N. Demattia, Lindstrom, MN (US); Louis Mark Holzman, Saint Paul, MN (US)

(73) Assignee: Ecolab Inc., St. Paul, MN (US)

( * ) Notice: Subject to any disclaimer, the term of this patent is extended or adjusted under 35 U.S.C. 154(b) by 722 days.

This patent is subject to a terminal disclaimer.

(21) Appl. No.: 12/414,155

(22) Filed: Mar. 30, 2009

(65) Prior Publication Data

US 2009/0192763 A1 Jul. 30, 2009

Related U.S. Application Data

(62) Division of application No. 10/400,952, filed on Mar. 27, 2003, now Pat. No. 7,509,770.

(60) Provisional application No. 60/368,647, filed on Mar. 29, 2002.

(51) Int. Cl.
*A01M 1/10* (2006.01)
*A01M 23/00* (2006.01)

(52) U.S. Cl.
USPC .................... 43/58; 43/107; 43/114; 43/74

(58) Field of Classification Search
USPC ............ 43/124, 107, 114, 58, 74; 340/573.1, 340/573.2, 573.3, 517, 521, 539.22, 541, 340/7.52, 825.36, 825.37
See application file for complete search history.

(56) References Cited

U.S. PATENT DOCUMENTS 1,758,952 A * 5/1930 Kness ................................ 43/74
2,433,913 A * 1/1948 Kness ................................ 43/74
(Continued)

FOREIGN PATENT DOCUMENTS

EP    0 283 142 A1    9/1988
EP      283142 A1 *  9/1988 ............ A01M 23/38
(Continued)

OTHER PUBLICATIONS

"Live Mouse Traps", Pest Products, http://www.pestproducts.com/live_mouse_traps.htm, Mar. 14, 2006. (6 pgs.).

(Continued)

*Primary Examiner* — Darren W Ark
(74) *Attorney, Agent, or Firm* — Shumaker & Sieffert, P.A.

(57) ABSTRACT

A reporting system for collecting, communicating and analyzing information from a plurality of pest monitoring locations is disclosed. The monitored locations include activity sensing pest devices. These devices can include traps and/or passive and active monitoring devices not having a trapping or killing functionality. While traps may constitute the majority of activity sensing pest devices in a given pest control program, devices which only monitor pest activity may be preferred in some locations and applications. The system includes automatic reporting from the plurality of activity sensing pest devices and also includes physical inspection data. Preferably an automatic real-time communication system is used, with the preferred communication system being a radio-frequency (RF) or other over-the-air system. However, hardwired systems, use of a personal digital assistant (PDA) as an interim data carrier, and other technologies may also be employed. Manual input means for providing the additional physical inspection data on the activity sensing pest device parameters and a computer based report generation means (of the resulting combined data) provide for a robust and efficient pest monitoring and/or trapping tool.

24 Claims, 16 Drawing Sheets

(56) References Cited

U.S. PATENT DOCUMENTS

| | | | |
|---|---|---|---|
| 2,594,182 A * | 4/1952 | Kness | 43/74 |
| 2,637,931 A * | 5/1953 | Sklar | 43/83 |
| 3,508,358 A * | 4/1970 | Lee | 43/60 |
| 3,843,924 A | 10/1974 | Wahlgren | |
| 3,843,942 A * | 10/1974 | Pierret et al. | 333/18 |
| 3,992,803 A * | 11/1976 | Kaiser | 43/83 |
| 4,030,230 A * | 6/1977 | Souza | 43/81 |
| 4,040,046 A * | 8/1977 | Long et al. | 340/870.02 |
| 4,275,523 A | 6/1981 | Baima et al. | 43/112 |
| 4,517,557 A * | 5/1985 | Agron et al. | 43/81 |
| 4,525,699 A * | 6/1985 | Buck et al. | 340/512 |
| 4,581,606 A * | 4/1986 | Mallory | 340/539.22 |
| 4,862,145 A * | 8/1989 | Meehan et al. | 340/573.2 |
| 4,884,064 A * | 11/1989 | Meehan | 43/58 |
| 5,005,416 A * | 4/1991 | Vick et al. | 43/121 |
| 5,040,326 A * | 8/1991 | Van Dijnsen et al. | 43/58 |
| 5,154,017 A * | 10/1992 | Disalvo | 43/81 |
| 5,392,732 A * | 2/1995 | Fry | 119/57.9 |
| 5,477,635 A * | 12/1995 | Orsano | 43/81 |
| 5,815,090 A * | 9/1998 | Su | 340/573.2 |
| 5,959,529 A * | 9/1999 | Kail, IV | 340/825.36 |
| 5,987,105 A * | 11/1999 | Jenkins et al. | 379/106.01 |
| 6,016,623 A * | 1/2000 | Celestine | 43/74 |
| 6,052,066 A * | 4/2000 | Su | 43/124 |
| 6,060,994 A * | 5/2000 | Chen | 340/521 |
| 6,067,018 A * | 5/2000 | Skelton et al. | 340/573.3 |
| 6,125,576 A * | 10/2000 | Knuppel | 43/74 |
| 6,163,257 A * | 12/2000 | Tracy | 340/506 |
| 6,202,340 B1* | 3/2001 | Nieves | 43/61 |
| 6,218,953 B1* | 4/2001 | Petite | 340/521 |
| 6,225,901 B1* | 5/2001 | Kail, IV | 340/825.36 |
| 6,230,434 B1* | 5/2001 | Knuppel | 43/74 |
| 6,239,700 B1* | 5/2001 | Hoffman et al. | 340/573.1 |
| 6,246,325 B1* | 6/2001 | Chittipeddi | 340/825.36 |
| 6,313,643 B1 | 11/2001 | Tirkel et al. | |
| 6,353,385 B1* | 3/2002 | Molini et al. | 340/541 |
| 6,445,301 B1* | 9/2002 | Farrell et al. | 43/58 |
| 6,452,490 B1* | 9/2002 | Garland et al. | 340/521 |
| 6,493,988 B1* | 12/2002 | Johnson | 43/131 |
| 6,542,078 B2* | 4/2003 | Script et al. | 340/545.1 |
| 6,570,496 B2* | 5/2003 | Britton | 340/541 |
| 6,580,360 B1* | 6/2003 | McKee et al. | 340/541 |
| 6,631,583 B2* | 10/2003 | Rollins | 43/132.1 |
| 6,661,340 B1* | 12/2003 | Saylor et al. | 340/521 |
| 6,707,384 B1* | 3/2004 | Shuman et al. | 340/573.1 |
| 6,720,874 B2* | 4/2004 | Fufido et al. | 340/541 |
| 6,724,303 B2* | 4/2004 | McGunn et al. | 340/521 |
| 6,724,312 B1* | 4/2004 | Barber et al. | 43/132.1 |
| 6,775,946 B2* | 8/2004 | Wright | 43/58 |
| 6,778,085 B2* | 8/2004 | Faulkner et al. | 340/541 |
| 6,792,395 B2* | 9/2004 | Roberts | 702/188 |
| 6,828,909 B2* | 12/2004 | Script et al. | 340/545.1 |
| 6,914,529 B2* | 7/2005 | Barber et al. | 43/124 |
| 6,922,940 B2* | 8/2005 | Rollins | 43/124 |
| 6,937,156 B2* | 8/2005 | Gardner et al. | 340/573.2 |
| 6,970,081 B1* | 11/2005 | Cheng | 340/541 |
| 6,998,980 B2* | 2/2006 | Ingley et al. | 340/539.26 |
| 7,002,465 B2* | 2/2006 | Komatsu et al. | 340/539.22 |
| 7,026,942 B2* | 4/2006 | Cristofori et al. | 43/58 |
| 7,053,767 B2* | 5/2006 | Petite et al. | 340/539.22 |
| 7,069,188 B2* | 6/2006 | Roberts | 702/188 |
| 7,071,829 B2* | 7/2006 | Gardner et al. | 43/107 |
| 7,317,399 B2* | 1/2008 | Chyun | 43/58 |
| 7,363,744 B2* | 4/2008 | Kness et al. | 43/74 |
| 7,401,436 B2* | 7/2008 | Chyun | 43/114 |
| 7,411,497 B2* | 8/2008 | Kates | 340/573.1 |
| 7,509,770 B2* | 3/2009 | Gardner et al. | 43/58 |
| 7,530,195 B2* | 5/2009 | Muller et al. | 43/58 |
| 7,591,099 B2* | 9/2009 | Lang et al. | 43/107 |
| 7,656,300 B2* | 2/2010 | Ronnau | 340/573.2 |
| 7,779,575 B2* | 8/2010 | Hirafuji et al. | 43/112 |
| 8,026,822 B2* | 9/2011 | Borth et al. | 340/573.2 |
| 8,156,683 B2* | 4/2012 | Slotnick | 43/81 |
| 2001/0054962 A1* | 12/2001 | Barber et al. | 340/573.2 |
| 2002/0118107 A1* | 8/2002 | Yamamoto et al. | 340/541 |
| 2003/0160699 A1* | 8/2003 | Trompen | 43/124 |
| 2003/0210139 A1* | 11/2003 | Brooks et al. | 340/541 |
| 2004/0020100 A1 | 2/2004 | O'Brien et al. | |
| 2004/0086089 A1* | 5/2004 | Naidoo et al. | 340/541 |
| 2004/0086090 A1* | 5/2004 | Naidoo et al. | 340/541 |
| 2005/0097808 A1* | 5/2005 | Vorhies et al. | 43/58 |
| 2005/0151653 A1* | 7/2005 | Chan et al. | 43/58 |
| 2006/0123693 A1 | 6/2006 | Muller et al. | |
| 2006/0150470 A1 | 7/2006 | Ronnau | |
| 2007/0169401 A1 | 7/2007 | Chyun | |
| 2007/0192032 A1* | 8/2007 | David et al. | 702/19 |
| 2008/0204253 A1* | 8/2008 | Cottee et al. | 340/573.2 |
| 2011/0109460 A1* | 5/2011 | Lloyd et al. | 43/58 |

FOREIGN PATENT DOCUMENTS

| | | | | |
|---|---|---|---|---|
| EP | 395135 A1 * | 10/1990 | | A01M 23/38 |
| JP | 04166033 A * | 6/1992 | | A01M 23/00 |
| JP | 6-22671 B1 | 2/1994 | | |
| JP | 06022671 A * | 2/1994 | | A01M 1/22 |
| JP | 4-166033 B1 | 6/1994 | | |
| JP | 9-65812 B10 | 3/1997 | | |
| JP | 09065812 A * | 3/1997 | | A01M 23/00 |
| JP | 09094048 A * | 4/1997 | | A01M 1/00 |
| JP | 09168359 A * | 6/1997 | | A01M 1/00 |
| JP | 09 094048 | 8/1997 | | |
| JP | 10-84834 B1 | 4/1998 | | |
| JP | 10084834 A * | 4/1998 | | A01M 1/00 |
| JP | 2004-57147 B1 | 2/2004 | | |
| JP | 2004057147 A * | 2/2004 | | A01M 23/00 |
| JP | 2004-129594 B1 | 4/2004 | | |
| WO | WO 02/21912 A2 | 3/2002 | | |
| WO | WO 02/26033 A1 | 4/2002 | | |
| WO | WO 2004/030450 A2 | 4/2004 | | |
| WO | WO 2004030450 A2 * | 4/2004 | | A01M 23/00 |

OTHER PUBLICATIONS

"do-it-yourself Pest Control", http://www.doyourownpestcontrol.com/info/rodents/multiple.htm, May 12, 2006 (7 pgs).

Rodent Removal, Elimination, Biology, Pest Products, http://www.pestproducts.com/rodents.htm, May 15, 2006 (10 pgs.).

US 5,356,690, 10/1994, Nelson et al. (withdrawn).

* cited by examiner

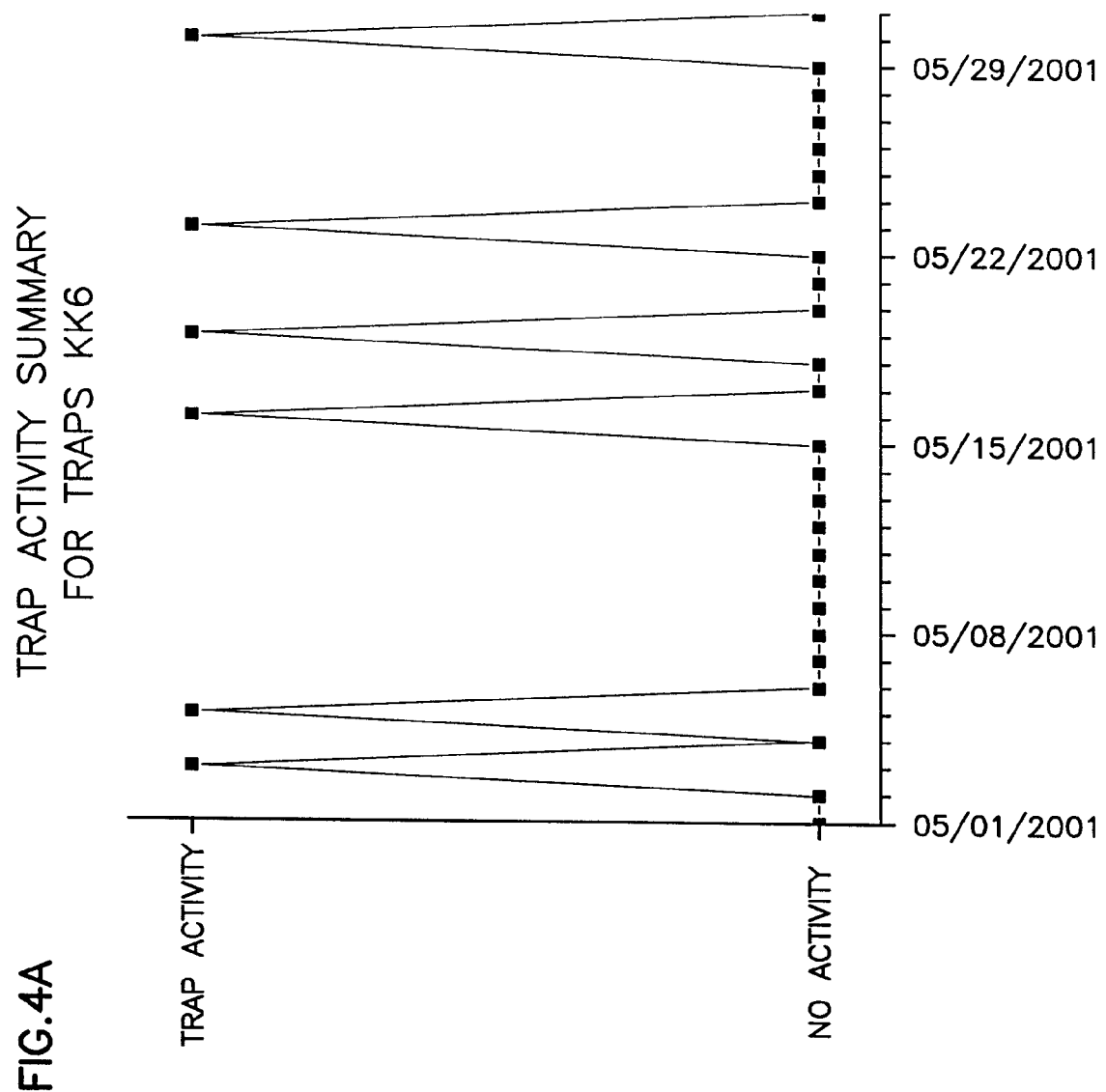

FIG.4B

SUMMARY REPORT FOR INSPECTION

| ACTIVITY SENSING DEVICE | ACTIVITY | SERVICE REQUIRED THIS VISIT |
|---|---|---|
| KK1 | 1 | ACTIVITY SERVICE REQUIRED |
| KK6 | 12 | ACTIVITY SERVICE REQUIRED |
| KK11 | 2 | ACTIVITY SERVICE REQUIRED |
| KK2 | 0 | REGULAR SERVICE REQUIRED |
| KK3 | 0 | REGULAR SERVICE REQUIRED |
| KK4 | 0 | SERVICE NOT REQUIRED THIS VISIT |
| KK5 | 0 | SERVICE NOT REQUIRED THIS VISIT |
| KK7 | 0 | SERVICE NOT REQUIRED THIS VISIT |
| KK8 | 0 | SERVICE NOT REQUIRED THIS VISIT |
| KK9 | 0 | SERVICE NOT REQUIRED THIS VISIT |
| KK10 | 0 | SERVICE NOT REQUIRED THIS VISIT |
| KK12 | 0 | SERVICE NOT REQUIRED THIS VISIT |

FIG.4D

SUMMARY REPORT FOR MAY 2001:

| TRAP | TRAP ACTIVITY | RODENT ACTIVITY | SERVICE NOTES |
|---|---|---|---|
| KK1 | 1 | 1 | SERVICED 5/31/01 RODENT ACTIVITY |
| KK2 | 0 | 0 | SERVICED 5/31/01 NO RODENTS |
| KK3 | 0 | 0 | SERVICED 5/31/01 NO RODENTS |
| KK4 | 0 | 0 | SERVICED 5/1/01 NO RODENTS |
| KK5 | 0 | 0 | SERVICED 5/1/01 NO RODENTS TRAP MOVED |
| KK6 | 12 | 6 | SERVICED 5/31/01 RODENT ACTIVITY |
| KK7 | 0 | 0 | SERVICED 5/1/01 NO RODENTS |
| KK8 | 0 | 0 | SERVICED 5/1/01 NO RODENTS |
| KK12 | 0 | 0 | SERVICED 5/1/01 NO RODENTS |
| KK9 | 0 | 0 | SERVICED 5/1/01 NO RODENTS |
| KK10 | 0 | 0 | SERVICED 5/1/01 NO RODENTS TRAP BURIED |
| KK11 | 2 | 1 | SERVICED 5/31/01 RODENT ACTIVITY |
| KK12 | 0 | 0 | SERVICED 5/1/01 NO RODENTS |

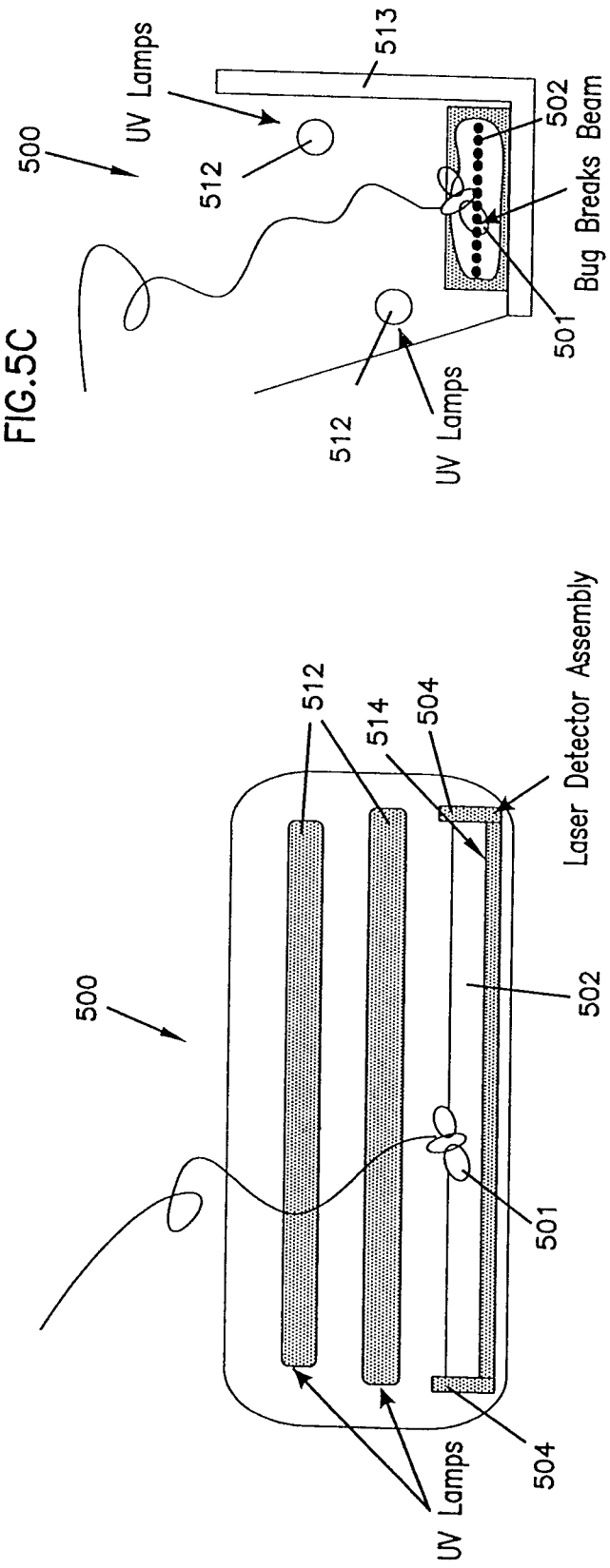

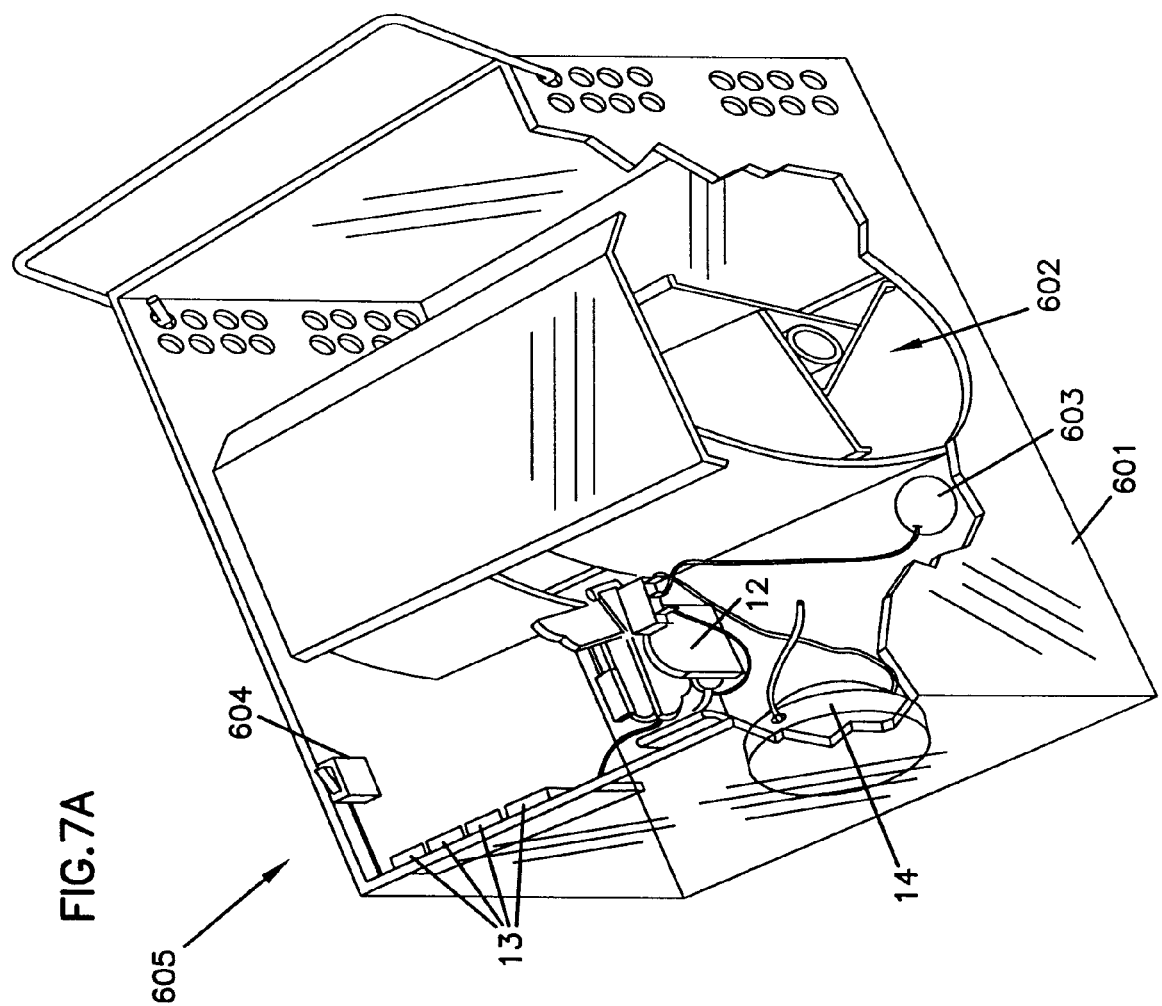

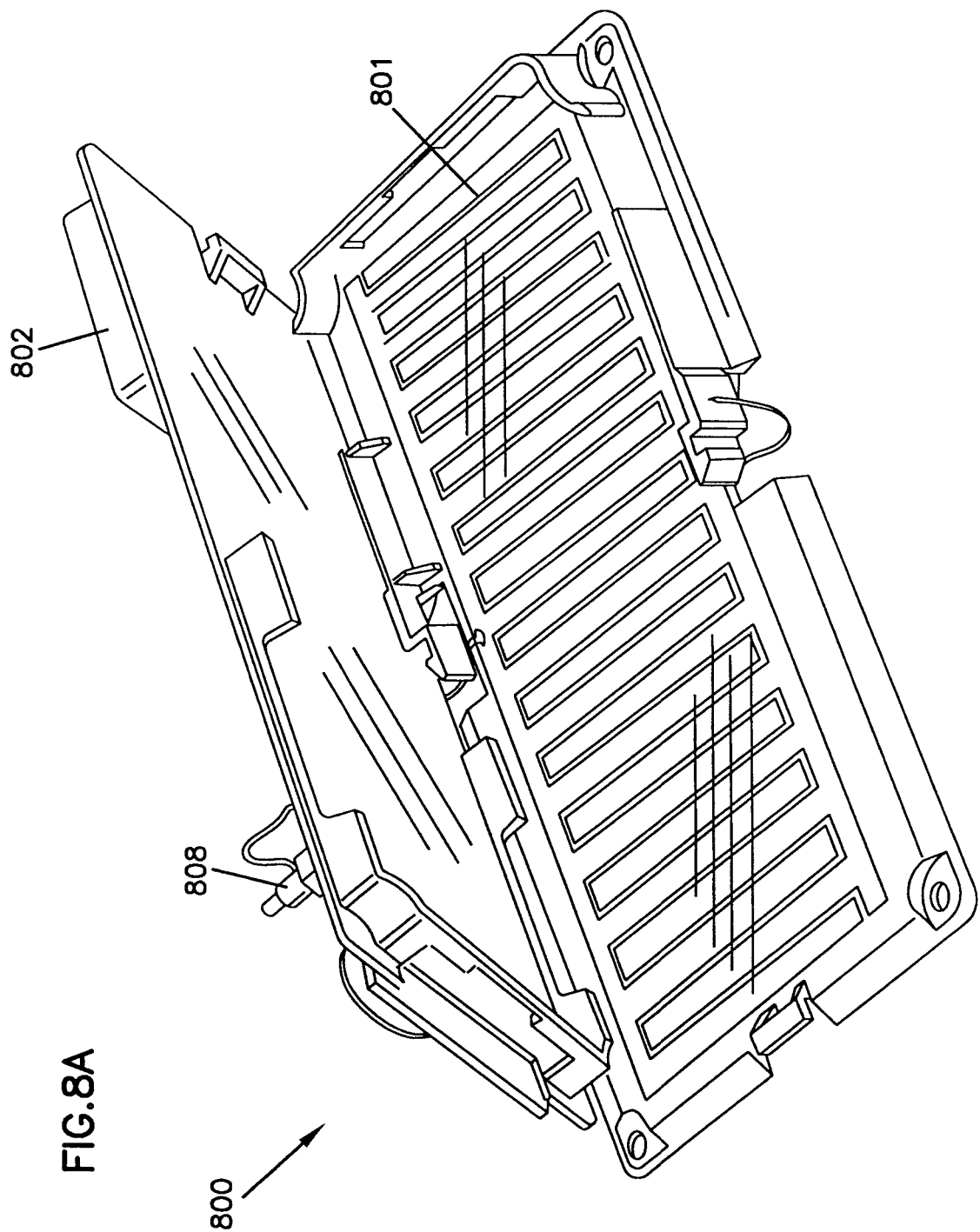

US 8,635,806 B2

METHOD AND APPARATUS FOR AUTOMATIC PEST TRAP REPORT GENERATION AND ADDITIONAL TRAP PARAMETER DATA

This is a divisional of U.S. application Ser. No. 10/400,952, filed Mar. 27, 2003, which claims the benefit of provisional application Ser. No. 60/368,647, filed Mar. 29, 2002, the entire contents of which are incorporated herein by reference.

FIELD OF THE INVENTION

This invention relates generally to a method and apparatus for providing reporting on a plurality of activity sensing pest devices; more particularly to a system for providing automatic reporting from a plurality of activity sensing pest devices together with physical inspection data; and still more particularly to an automatic real-time reporting system for a plurality of traps with manual input means for providing additional data on trap parameters based on physical inspection and a report generation means on the resulting combined data.

BACKGROUND

Rodents, flies, cockroaches, and other nuisance insects and animals (hereafter referred to collectively as "pests") create health concerns and introduce spoilage, among other concerns. Many businesses deploy a variety of traps and/or monitors throughout the business' physical premises and facilities to insure a reduction and/or elimination of such pests. These actions can be undertaken to insure inspection compliance, to maintain sanitary conditions, reduce spoilage, comply with applicable laws and regulations, and/or increase consumer confidence. Even upon complete elimination of pests from a physical site, however, the pests can often find their way back into the premises. For example, open doors, windows or loading docks, cracks in foundations, delivery of contaminated materials or packaging, etc., may all provide an avenue for access back into the premises. Therefore, even if the pests are reduced or eliminated, pest traps are continuously used in order to detect the presence of pest activity.

Since many physical plants are large, often a great many traps are required to adequately cover the premises. As the number of traps increases, so too does the time and labor required to physically inspect the traps. Presently, physical inspections of each and every trap at a facility are performed at desired time intervals (e.g., weekly or monthly). These inspections insure that captured pests are removed from the trap, that the trap is in working order and that the trap is still in the proper location. It will be appreciated, however, that while each trap is inspected, such inspection is not oftentimes needed for each trap. For example, in many cases a large number of traps did not catch any pests in the given time interval, the traps are still in working order and the traps are properly placed.

In the prior art, systems have been developed (such as U.S. Pat. Nos. 4,517,557; 4,884,064; and 5,949,636) which are focused principally on notification of trap activity. These same devices suffer from drawbacks in that they do not provide additional information regarding the time of activity, the condition of the trap and the ability to track other parameters which may help reduce the pests on a more constant basis on the premises.

For example these prior art systems do not have the ability to reconcile different modes of trap activity, such as human or environmental interference with actual pest activity. A pest control system can preferably differentiate pest and non-pest activity in order to use information to identify and address the source of pest activity. An additional drawback of systems in the prior art is the lack of ability to track the action(s) taken once trap activity occurred. Such actions may include the trap being inspected and emptied, if required, as well as the time between trapping a pest and removing it from the facility.

Pest information systems utilizing barcode scanning and manual data input are also known in the art. These systems (such as the bar coding system sold under the designation Estat by the assignee of the present invention, Ecolab Corporation, as part of its Ecopro system) do not quantitatively track pest activity as a function of desired time intervals (e.g., such as daily, hourly, etc.). Additionally, the prior art barcode scanning systems do not provide data or otherwise indicate potential trap activity prior to actually visiting the trap.

A combination of activity sensing pest devices equipped with feedback mechanisms would significantly improve the ability to deliver pest control at a facility. For example by having a more comprehensive understanding of the conditions which existed when the pest was captured, such conditions may be altered so that the opportunities to capture additional pests and/or reduce the re-introduction of pests into the facility are maximized. By taking such proactive steps, the costs and labor associated with monitoring the traps may be ultimately reduced.

Therefore, there arises a need for a pest monitoring and reporting apparatus and method which provides timely reporting on pest conditions and for the introduction of additional data from a physical inspection of the pest monitoring location. The pest monitoring location can be a passive or active monitoring location, can include trapping, and/or can include a combination of monitoring and trapping. Further, such system would also help reduce unnecessary visits to a number or percentage of the locations and traps that do not require physical inspection at that time. The present invention directly addresses and overcomes the shortcomings of the prior art.

SUMMARY

The present invention provides for a method, apparatus and reporting system for collecting, communicating and analyzing information from a plurality of pest monitoring locations. The monitored locations include activity sensing pest devices. These devices can include traps and/or passive and active monitoring devices not having a trapping or killing functionality. While traps may constitute the majority of activity sensing pest devices in a given pest control program, devices which only monitor pest activity may be preferred in some locations and applications. Accordingly, both types of devices may be utilized in the various environments in which the present invention may be employed. Further, unless the context provides otherwise, both traps and passive or active pest monitoring devices are included within both the scope of the term "activity sensing pest devices" and within the scope of the invention.

The system provides automatic reporting from a plurality of activity sensing pest devices and further includes physical inspection data. The resulting reports, due to the additional information, provide a finer granularity report than was possible in the prior art. Further, in the preferred embodiment, an automatic real-time communication system is used in connection with a plurality of activity sensing pest devices. The communication system is preferably radio-frequency (RF) or other over-the-air system. However, hardwired systems, use of a personal digital assistant (PDA) as an interim data carrier, and other technologies may also be employed. Manual input means for providing the additional physical inspection data on the activity sensing pest device parameters and a computer based report generation means (of the resulting combined data) provide for a robust and efficient pest monitoring and/or trapping tool.

In one preferred embodiment of the present invention, a device constructed in accordance with the principles of the present invention includes a plurality of pest presence sensors located within, adjacent or proximate to a plurality of pest traps. As noted above, the sensors may also be used without a trapping or killing functionality directly associated therewith. Therefore, the individual sensors detect the presence of a pest, detect the presence of a pest in a respective trap and/or detect that the trap has operated in a manner indicating the presence of a pest within the trap (e.g., that the trap was activated). When the sensor detects this condition, a pest signal is generated and a communication device acts to relay the event data and a trap identifier code to a computer. The sensor may also provide a time stamp for the event data. Alternatively, the computer can generate a time stamp based on the time that the signal is received. Since many traps are multiple catch traps, the present invention provides for recording and tracking multiple events from a single trap. Similarly, pest monitoring devices that do not include a trap often can provide information on multiple pest events. The transmitted data is collected in a database program running on the computer, and an initial report is generated.

During or subsequent to generating the initial report, a physical inspection of those traps generating one or more events occurs. The physical inspection includes resetting traps, identifying false positive trap conditions, correcting trap location placement, and identifying other trap parameter data. Such data is preferably input at the trap itself via a manual data entry device. It will be appreciated, however, that such physical inspection data may also be temporarily stored in a portable computer (for example a personal digital assistant (PDA)) and subsequently downloaded into the computer database. A physical inspection can also be made of an area in which a monitoring device is located only for pest detection and not trapping. Inspection of such areas are preferably made if such monitor has generated one or more pest detection signals.

The resulting final report includes pest monitoring data, trap event data and the physical inspection data. This final report is beneficial to the pest control vendor and/or physical location manager since the combination of location, time stamp and physical inspection data can lead to determination of pest infiltration avenues. Furthermore, by generating an initial report, the physical inspection may be modified to visit only those traps or locations generating an event. Alternatively, a predetermined number and/or percentage of the other traps at the facility may also be visited on a periodic basis to insure that the traps are operable, properly placed, etc. Because fewer traps need to be visited on each physical inspection tour, less time is spent at the facility by the inspectors. This improves efficiency and cost effectiveness of the pest control program, while also improving the reporting function and the proactive nature of the pest control program.

Therefore, according to one aspect of the present invention, there is provided a pest monitor reporting system, comprising: a pest report database; a plurality of sensors, the sensors associated with respective activity sensing pest devices, the sensors being arranged and configured to determine if a pest is in the area monitored by the sensor and to generate a pest signal; a communication device, operatively connected to the sensors, for receiving the pest signal and for communicating to the pest report database that a pest signal occurred and the specific activity sensing pest device at which the pest signal occurred, wherein the pest report database is updated.

According to another aspect of the present invention, there is provided a pest monitor reporting system as described in the preceding paragraph wherein the pest activity sensing devices include a pest trap and/or include a pest monitor that does not include a trapping function.

According to a further aspect of the invention, there is provided a pest reporting method for a plurality of activity sensing pest devices (e.g., pest traps and/or monitors), comprising: monitoring a plurality of pest presence signaling devices associated with a similar number of pest traps and monitors; recording the occurrence of pest presence signals and associating the pest presence signal with individual traps and monitors; physically inspecting the pest traps and monitors which generate a pest presence signal; determining whether the pest presence signal is due to a pest or some other event; and recording additional data based on the physical inspection.

Another aspect of the invention includes the method as set forth in the preceding paragraph and further including one or more of the following additional steps: electronically recording additional data regarding trap condition; physically inspecting a number of the plurality of traps which did not generate a pest presence signal; generating a first report on the traps which generate a pest presence signal; and generating a second report which includes the pest presence signal data and the additional data.

While the invention will be described with respect to preferred embodiment configurations and with respect to particular devices used therein, it will be understood that the invention is not to be construed as limited in any manner by either such configuration or components described herein. Also, while the particular types of pests and traps are described herein, it will be understood that such particular pests and traps are not to be construed in a limiting manner. Instead, the principles of this invention extend to any environment in which pest detection is desired. Further, while the preferred embodiments of the invention will be generally described in relation to transmitting and receiving RF information from the traps, it will be understood that the scope of the invention is not to be so limited. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

BRIEF DESCRIPTION OF THE DRAWINGS

Referring to the drawings, wherein like numerals represent like parts throughout the several views:

FIG. 5 b schematically illustrates a functional diagram of an exposed elevated side view of the fly trap of FIG. 5 a.

FIG. 5 c schematically illustrates a functional diagram of an exposed elevated end view of the fly trap of FIG. 5 a.

FIG. 7 b illustrates a second perspective view with portions broken away of a wind-up type rodent trap of FIG. 7 a.

FIG. 8 b illustrates a perspective view of the monitor of FIG. 8 a with the cover of the insect monitor in place.

FIG. 8 c schematically illustrates a functional block diagram of the insect monitor of FIG. 8 a constructed in accordance with the principles of the present invention.

FIG. 9 b illustrates the Tin-Cat style rodent trap of FIG. 9 a with the cover hinged open to reveal the interior of the trap.

DETAILED DESCRIPTION

A system constructed in accordance with the principles of the present invention may be employed in a variety of environments and with a variety of components. The system may include a variety of styles of activity sensing pest devices within a single facility (e.g., for trapping or sensing any type of animal, rodent, fly or insect) and utilizing a single reporting database; include individual styles of activity sensing pest devices in different reporting databases for the same facility; and/or include a single type of activity sensing pest devices in one or more reporting databases. In each case, the principles apply to an automatic, real-time reporting system for a plurality of activity sensing pest devices (e.g., traps and/or pest presence monitors), with manual input means for providing additional data on both the pest trap and pest monitor parameters based on physical inspection. A reporting database collects the data and provides reports on the resulting combined data. The system reports have greater utility, improve time, costs and efficiencies associated with inspection of the traps, and improves pest control.

A discussion of the various preferred trap and monitor embodiments which may be used in connection with the present invention will be deferred pending a discussion of the functional elements making up the present invention.

Figure 1:
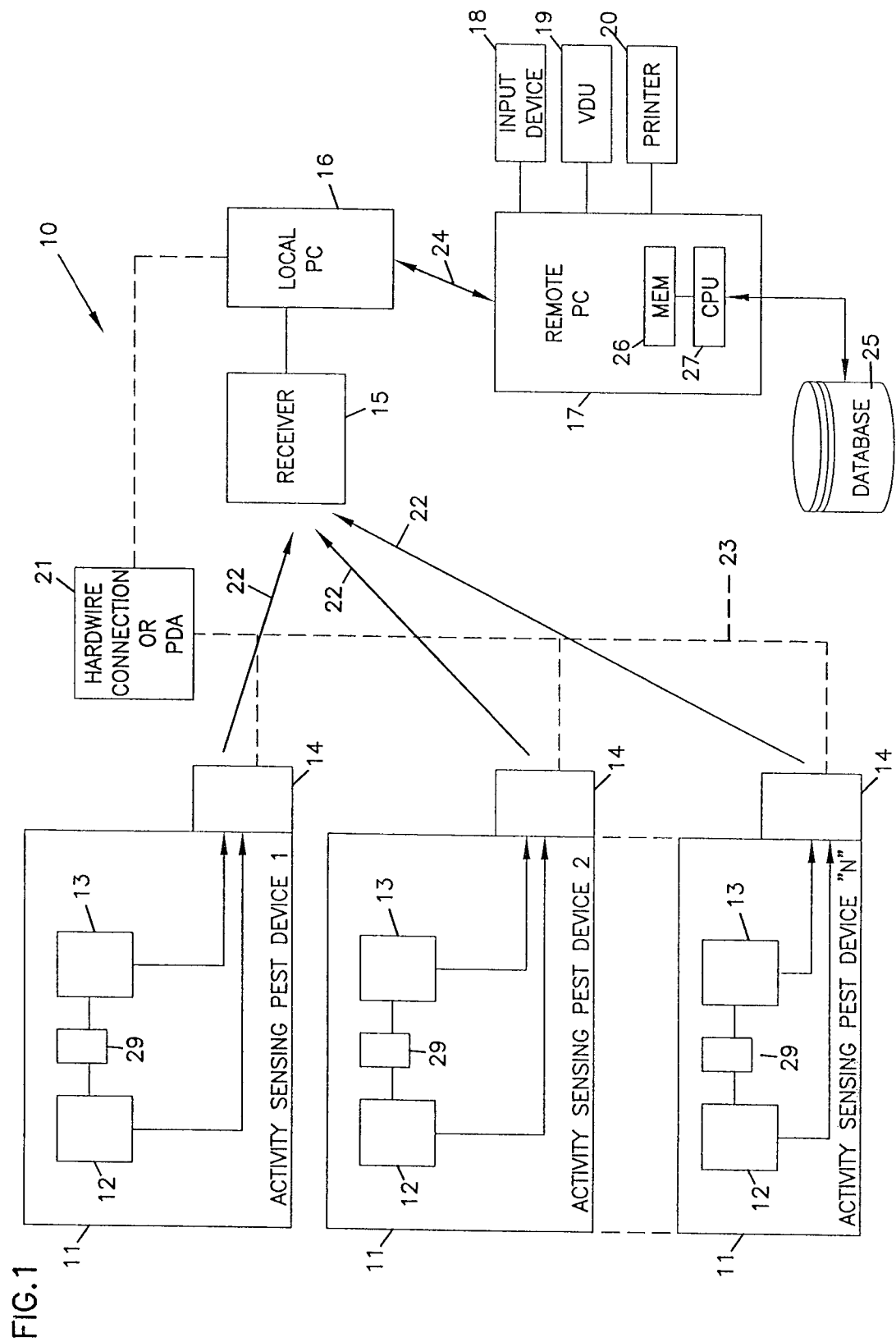
FIG. 1 is a functional block diagram of an automatic pest control report generation with additional trap parameter data system.

First referring to FIG. 1, a functional block diagram of the automatic pest report generation system and additional pest trap and pest monitor parameter data is provided. The system is shown generally by the designation 10. A plurality of activity sensing pest devices are shown at the designation 11. Any number of "n" activity sensing pest devices 11 may be utilized in connection with the present invention. In the case of traps, each of the n traps 11 include a pest enclosing, retaining or killing device (best seen in FIGS. 6, 7 a-7 b, and 9 a-9 b and discussed further below). As discussed above, one or more of the activity sensing pest devices 11 can also take the form of a passive or active pest monitor—which monitor may or may not include a trapping device (best seen in FIGS. 5 a-5 c and FIGS. 8 a-8 c). A pest sensor 12, a physical inspection data entry device 13, and a communication block 14 are also provided.

Pest sensor 12 may take a number of forms, but in each form generally monitors pest activity in and/or about the trap 11. Examples of the pest sensor 12 include a switch or mercury switch (for monitoring movement of the trap), a capacitance device (for monitoring a pest altering the capacitance of a grid), a current monitoring device (for detecting current spikes in a destructive or electrocution style trap), or light extinction of a light source (for monitoring an interrupted beam or laser). The sensor 12 is generally located in or on the pest trap 11. However, it is possible to also locate the pest sensor 12 adjacent or proximate the trap 11. It will be appreciated that sensor 12 may be located in an area without a trap being present. In this latter case, the sensor 12 acts as a pest monitor for that area. When pest activity is detected and a pest presence or detection signal is generated by the sensor 12, the pest presence signal is provided to the communication block 14.

The communication block 14 may take a number of forms. For example, the communication block may communicate over a fixed wire (e.g., to hardwire receiver 21 via optional connection 23) or by telephone or cellular phone, it may take advantage of putting signals over existing wiring in a building, or it may utilize over-the-air transmissions designated as 22. In each of these forms, the communication block 14 operates to pass the pest presence or detection signal—as a pest event—to a receiver 15 (or alternatively directly to local PC 16). In the preferred embodiment, an RF type communication device is utilized. In this type of embodiment, the receiver 15 will generally be located relatively close to the transmitter device in communication block 14. In the preferred embodiment, the transmitter range is generally around one hundred feet. However, the range is affected by, among other factors, the type of RF device used and by the structural characteristics of the facility or area. If appropriate communication schemes are utilized, then the receiver 15 may be located off-site.

Sensor 12 may include a memory device or other data storage to accumulate event data and then pass along a block of information to the communication device. For example, sensor 12 may be constructed to archive pest presence signals in an onboard memory location or in a separate memory device 29. The later communication of the stored data may occur at set intervals, may be prompted by a polling transaction, or may be physically activated by an inspector via a personal computer, special purpose computing device, or PDA. By storing the data, any number of pest detection events may be transmitted as a block.

For example, in one embodiment (best seen in FIG. 5 a and discussed in more detail below) the sensor may archive event data in the counter block 511. The counter block 511 can include an electronic memory storage location, and can optionally include a visually perceptible means for displaying the data such as an LCD display or mechanical counter (not shown). The microprocessor block 509 can initiate transmission of the collected data via communications block 510. This can take the form of a PDA establishing contact with the communications block 510 or take another of the forms identified above. The data can be passed as individual event data or as histograms of the number of events within different time windows.

The sensor 12 provides data on the activity sensing pest devices 11 identifier code, the time of the event, and the event itself. However, the receiver 15 or local computer 16 (discussed below) may provide a date stamp for the received pest event. In one embodiment, the communication block 14 includes a transmitter manufactured by Freshloc Technologies, Inc. (Plano, Tex.). Such transmitter is a strobe radio frequency (RF) transmitter, disclosed in Heller U.S. Pat. No. 5,119,104 and Heller U.S. Pat. No. 6,222,440, which patents are hereby incorporated by reference. The code of such device may be modified in order to hold a resistance change for a period of time to insure that events are detected during polling.

Once the event is transmitted to receiver 15, the data is provided to local computer 16. Computer 16 may be a special purpose computing device or may be a personal computer (e.g., an IBM compatible computer having a Pentium style chip). The data is in turn provided to remote personal computer 17 over the internet or direct connection 24. Computer 17 includes a processor 27, input devices 18 (e.g., keyboard and mouse or other pointing device), video display unit 19, and a printer 20. CPU 27 is provided to run a database program stored in memory 26. The program may also be running from a hard drive, floppy drive, CD-ROM, or from a server or other computer on a network machine. The database 25 is stored in memory 26. It will be appreciated that the database may also be stored on a local area network server, hard drive, cd-rom drive or other storage device accessible by the CPU 27.

Database 25 stores the event data and includes other database functions, such as relating events to pest trap identification numbers, and generating reports, among others. In one embodiment, the database program is provided by FreshLoc Technologies as part of their system identified by as the FreshLoc system. However, other relational database programs capable of storing and relating fields in a number of records, and having a report writing capability may also be utilized. When utilizing other programs, the received data from the various activity sensing pest devices 11 must be recognized by the computer 17 and stored in the database 25. The database 25 can reside on local computer 16 with reports being generated locally and, optionally, transmitted to other computers via a network, extranet or internet.

Figure 3:
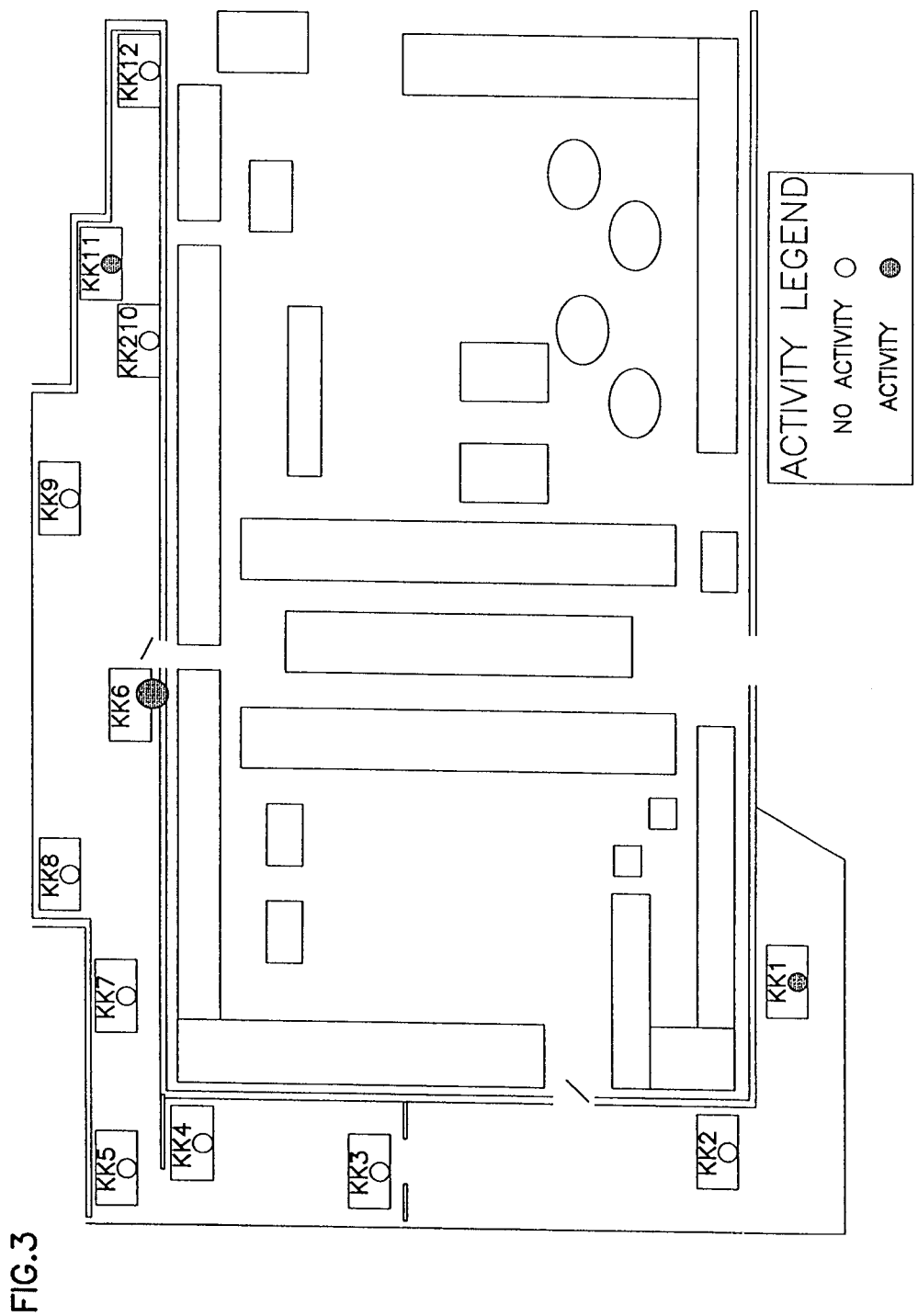
FIG. 3 is a representative trap location map illustrating the plurality of pest traps, with the traps including trap identifier codes.
Figure 4C:
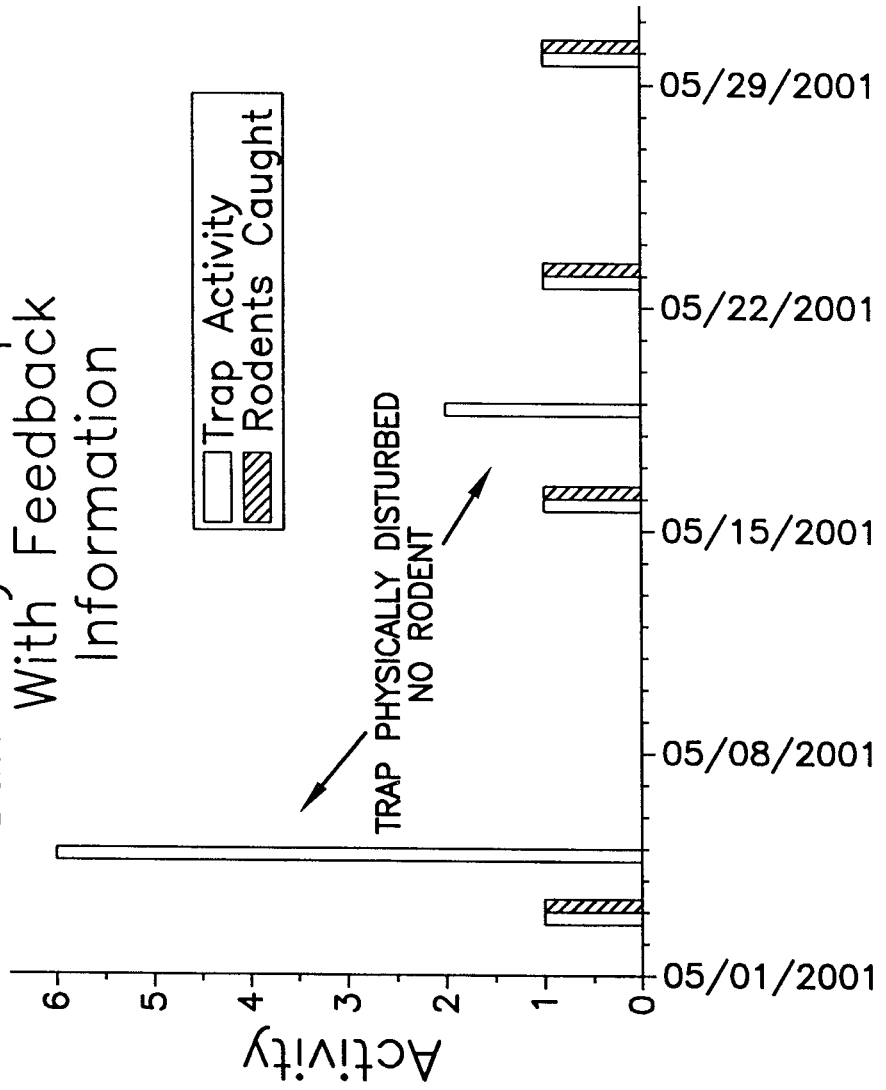
FIGS. 4 a-4 d are representative reports of the database program for the traps illustrated in FIG. 3.

In the database 25, the activity associated with each activity sensing pest devices 11 may be tracked by the unique ID number. The facility of interest contains any desired number of activity sensing pest devices 11 and the location of the activity sensing pest devices 11 are maintained with the unique ID number to be used in the reporting process. FIG. 3 illustrates a map of an exemplary facility with trap 11 locations and ID's shown. The map data is generated from database 25. FIGS. 4 *a*-4 *d* identify exemplary reports. An initial report including only trap activity data for a specific trap is illustrated in FIG. 4 *a*. It will be appreciated that "TRAP ACTIVITY" indicates that the sensor 12 employed in connection with the trap generated a pest presence signal which was relayed to the database 25. In FIG. 4 *a*, the specific trap identified in the report is associated with an identifier code "KK6" (best seen in the map of FIG. 3). Virtually any series of letters, numbers and symbols might be employed as identifier codes, with the identifier codes set forth herein merely being one example. It will also be appreciated that pest monitors may be provided with trap ID numbers regardless of whether a physical trap is associated with the pest monitor. In FIG. 4 *b*, an initial report is generated showing traps which have initiated pest presence signals and other traps which should be visited according to some schedule. The schedule to visit other traps can be random, predetermined, or statistically generated. In FIG. 4 *c*, a summary report with additional trap parameter data added following a physical inspection of the trap identified by the trap identification code KK 6 is illustrated. In FIG. 4 *d*, a summary report for each of the traps identified in FIG. 3 is shown. FIGS. 3 and 4 *a*-4 *d* will be discussed further below.

In order to provide the feedback information, each activity sensing pest device 11 also preferably includes one or more feedback devices 13 which permit an inspector to provide physical trap and monitor parameter feedback at the actual location of the activity sensing pest devices 11. This additional data is preferably input to the database 25 running on computer 17 (via the communication block 14 to receiver 15 to local computer 16). The feedback device 13 may take the form of one or more buttons; a keypad; a keyboard; one or more dipswitches; an infrared receiver which is configured to interact with a PDA (e.g., of the type sold under the designation Palm Pilot or other personal data device), or any other input device allowing selection among a plurality of parameter ID's such as those set forth in Table I below. In each case, the device 13 allows an inspector to indicate a particular parameter, from among a predetermined set of perimeters. For example, an inspector could indicate that a trap was inspected and no animal was found or that the trap was inspected and an animal was found. Table I includes a representative list of codes which may be utilized by a trap inspector. 1

TABLE I

| Parameter ID | Digital Code | Analog Code (Voltage level or resistance value) | Parameter Description |
|---|---|---|---|
| 1 | 0001 | V1/R1 | Trap Checked - No Activity |
| 2 | 0010 | V2/R2 | Trap Checked - Activity Type 1 Found |
| 3 | 0011 | V3/R3 | Trap Checked - Activity Type 2 Found |
| 4 | 0100 | V4/R4 | Trap Checked - Activity Type 3 Found |
| 5 | 0101 | V5/R5 | Trap Cleaned |
| 6 | 0110 | V6/R6 | Trap Out of Place |
| 7 | 0111 | V7/R7 | Trap Damaged |
| 8 | 1000 | V8/R8 | Light Bulb Replaced |
| 9 | 1001 | V9/R9 | Glueboard Replaced |
| 10 | 1010 | V10/R10 | Cover Opened |

It will be appreciated that the trap parameter/data is exemplary and other information may be provided. Further, the code number may be assigned arbitrarily. In other systems, the code number may be associated with other trap parameters. The resistance code is provided as an example of values which may be provided to a FreshLoc type system to distinguish between the various feedback data being entered. However, various voltage levels (as shown in Table I) may also be employed to generate the feedback data in an analog device.

The feedback data can alternatively be entered directly into local computer 16 by an operator after physically inspecting the traps. The data might also be temporarily stored during the inspection in a PDA or other special computing device, and subsequently downloaded into computer 16. In these embodiments, it will be appreciated that the input block 13, communication block 14 and receiver block 15 may be modified to function properly with the data gathering methodology employed. However, transmission of initial data on pest activity is preferred in order to generate an initial report (for example visits to the appropriate activity sensing pest devices can then be determined).

Preferably each activity sensing pest device 11 includes a feedback mechanism 13. Due to the characteristics of the physical premises, the costs, the benefits from the individual activity sensing pest device 1, and other factors, one or more of the activity sensing pest devices 11 may not include a feedback sensor 13. However, in view of the advantages provided by the feedback reporting system as described herein, it will be appreciated that the benefits increase as the amount and quality of the feedback data increases.

Figure 2:
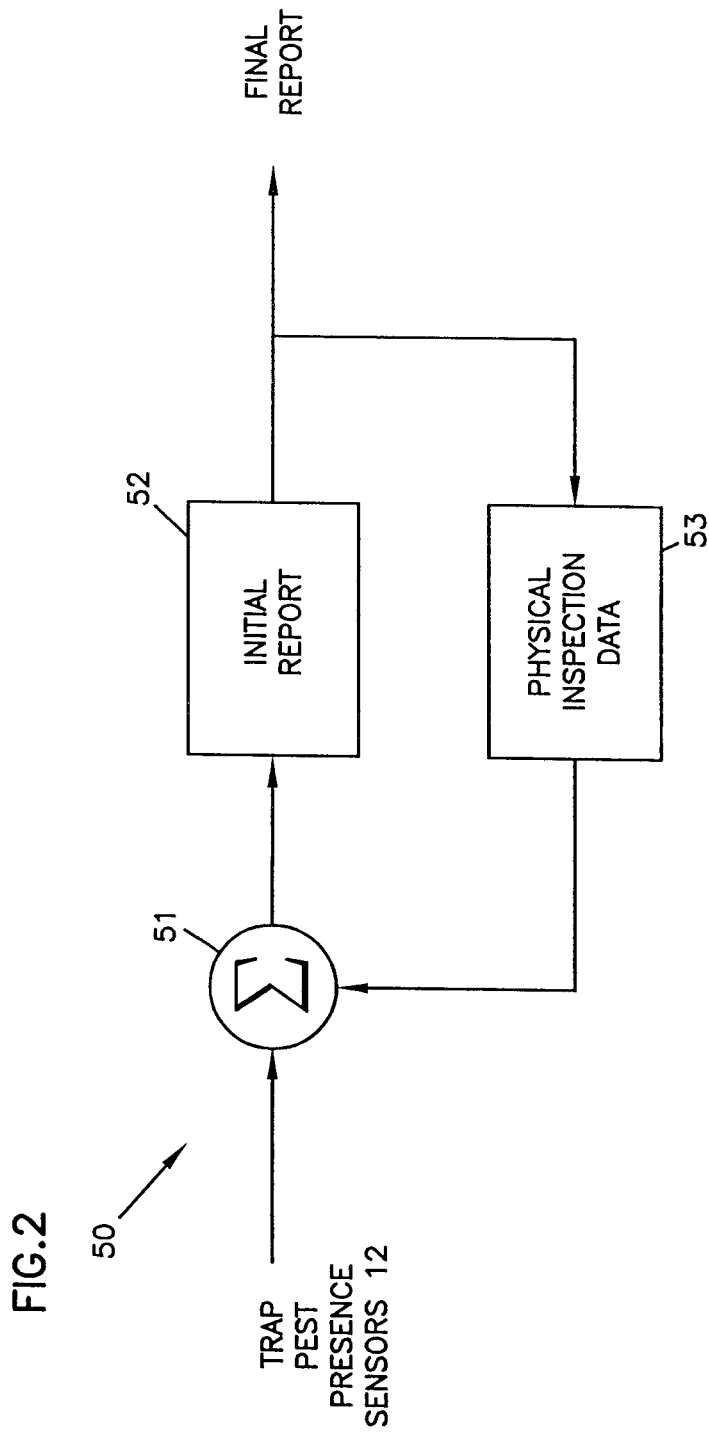
FIG. 2 is a schematic diagram of the report generation process of the system of FIG. 1.

Once transmitted to the database 25, the additional parameter data on the activity sensing pest devices is also tracked against the appropriate ID number. This results in a refining of both the data and the resulting reports from database 25. The activity sensing pest devices reporting becomes a feedback loop as illustrated in FIG. 2 by the designation 50. In FIG. 2 the sensors 12 provide data to summing block 51 and to initial report block 52. The physical inspection component of the process includes reviewing the initial report(s) 52 and providing additional physical inspection data at block 53. The physical inspection data can include data on each trap and monitor 11. However, preferably the data is for a smaller set of traps and monitors, which include those traps and monitors that generated a pest activity event signal and a number or percentage of the remaining traps and monitors of the "n" activity sensing pest devices 11 in the facility that did not show any pest activity.

The feedback loop provides data on false positives, disturbed traps, and other factors. The time data corresponding to when the pest activity occurs helps to proactively determine pest infiltration factors and/or information relating to maintaining an optimum pest control plan, such as disturbed traps, etc.

Turning to FIG. 3 and FIGS. 4 a-d, an example of the system will be described. In operation, if a mouse was caught in a mousetrap with trap id KK 6 (best seen in FIG. 3), the pest event for that trap would be generated and the date and time would be communicated to computer 17 for recording to database 25. As noted above, an alternative would be to use the clock on computer 16 and/or computer 17 and merely record the date and time of receipt of a transmission from a trap. A pest event may trigger an immediate physical inspection of the trap. However, generally such inspections would occur daily, weekly or monthly. An initial report showing the pest activity of a particular trap is generated (FIG. 4 a) and a plan to inspect traps 11 showing pest activity is determined (FIG. 4 b). In FIG. 4 a, the trap activity is shown only for trap KK 6. Two other traps are shown in FIG. 4 b as having trap activity. These other traps are traps KK 1 and KK 11. These three traps preferably have a different color corresponding to the Activity Legend illustrated in FIG. 3. The map in FIG. 3 also preferably provides an indication of the number of pest activity events received for the given activity sensing pest device.

FIG. 4 b also includes a plan to inspect other activity sensing pest devices 11. Although these latter devices 11 did not show pest activity, an inspection of the devices can reveal electronics malfunctions, undetected pest events, and visual evidence of pest activity that was not detected electronically. Accordingly, all activity sensing pest devices will generally be inspected periodically. Such inspections can occur at a lower frequency based on the initial reports. When the trap is physically inspected, feedback on the trap parameters can be provided to the system via one or more feedback devices 13. FIG. 4 c illustrates a summary for a particular trap which generated pest presence signals with additional feedback data added to the summary. As shown in FIG. 4 c, the trap was disturbed on two separate occasions with no rodent caught. This may be an indication of intentional or inadvertent movement of the trap by workers or inanimate objects (e.g., a forklift, pallets, etc.) in the area, a failing trap, or malfunction, among others. In any of these events, proactive measures can be taken to determine the cause of the activity. Additionally, final summary reports for all of the traps (or a subset thereof) can be generated as shown in FIG. 4 d.

The various styles of traps 11 may include a large variety of commercially available traps for trapping any type of animal, such as rodents or insects. Examples of commercially available live animal/rodent traps are the Victor M310 Tin Cat; the Havahart Live Traps; the Kwik Katch Mouse Trap, and the Kness Ketch-All. Examples of commercially available zapping light traps are the Gardner AG2001; the Gardner AG-661 Light Trap, and the Anderson Adhesive Insect Light Trap. Examples of commercially available glueboard light traps are the Ecolab Stealth Unit; the Gardner WS25; the Gardner GT100, and the Anderson Adhesive Insect Light Traps.

Several preferred embodiments of activity sensing pest devices 11 which may be utilized together with the present invention will next be discussed.

Figure 5A:
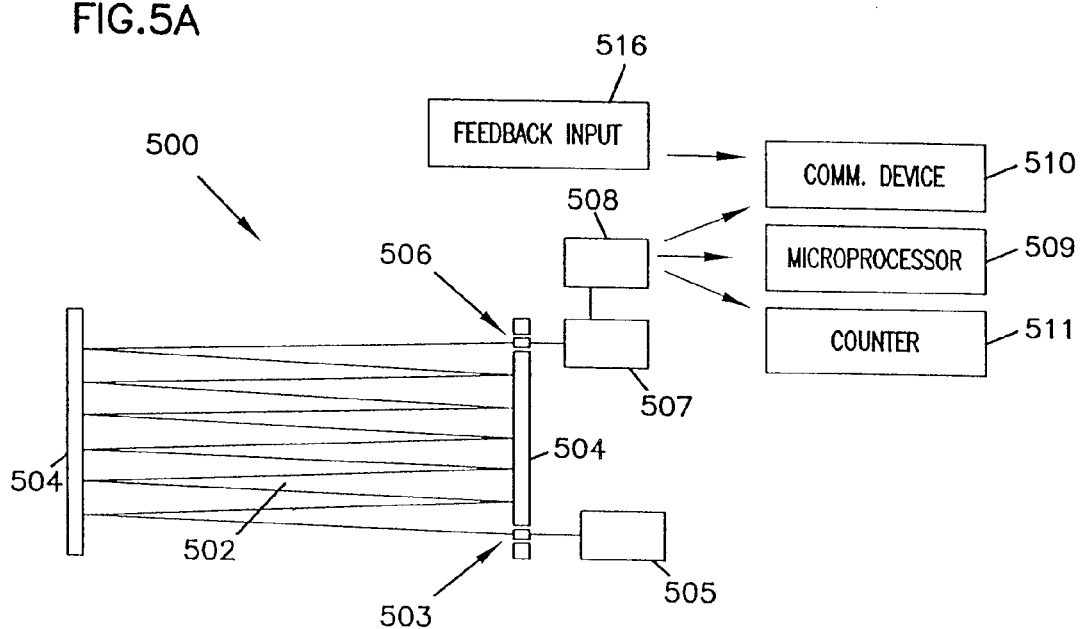
FIG. 5 a schematically illustrates a functional block diagram of a fly counter with an optional trapping function constructed in accordance with the principles of the present invention.
Figure 6:
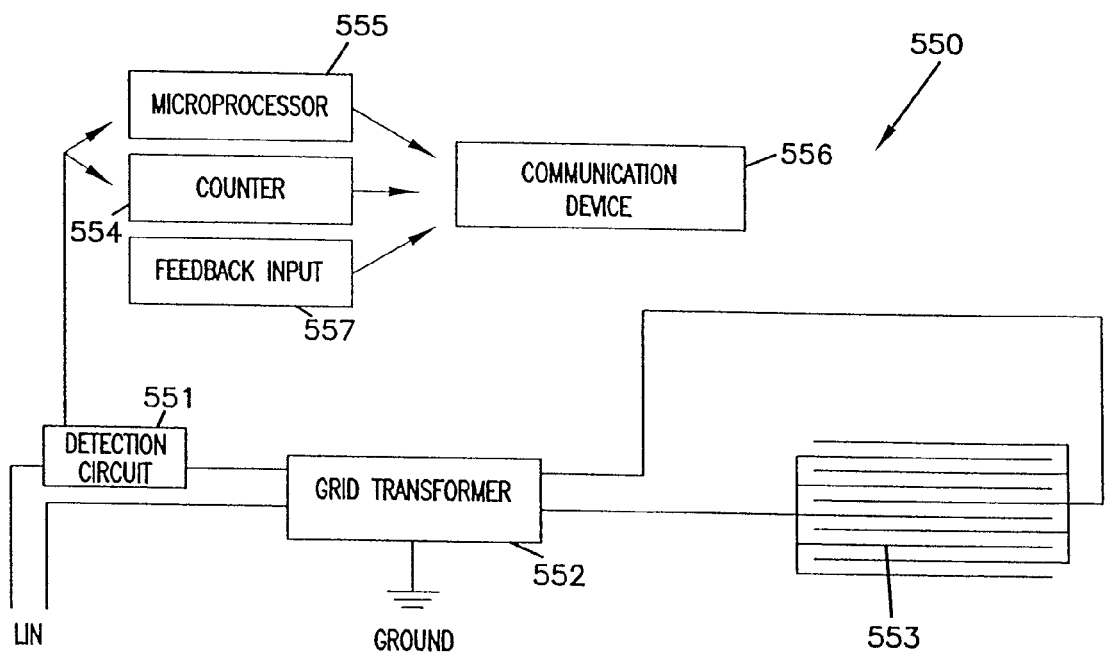
FIG. 6 schematically illustrates a functional block diagram of a destructive electrocution insect light trap constructed in accordance with the principles of the present invention.

FIGS. 5 a through 5 c illustrate a non-destructive flying insect monitor, while FIG. 6 illustrates a destructive flying insect trap. Current flytraps used in pest control service employ several methods of immobilizing flying insects. A service technician during routine service cleans the trap and may make a note of the extent of activity at the trap based on visual inspection. This standard method of pest control service has a number of limitations. Of primary importance to customers and pest control companies is verifying that technicians actually visited the trap and did not simply conjure up false information. A second limitation is that activity (i.e., a count of insects) is only trackable to the time between services, such as monthly or weekly. Since the data is not real-time activity, it cannot be broken down into daily or hourly counts. This limitation prevents the implementation of proactive solution of problems (e.g., such as employees leaving doors open) and the targeted response to known problems (e.g., such as discarding potentially contaminated products based on pest activity). The trap 500 shown in FIGS. 5 a-5 c overcomes these drawbacks by providing both real-time data logging and communication of additional trap parameters (e.g., service activity).

The trap 500 includes a curtain of light made up of a beam 502 which is bounced between reflective surfaces 504. In the preferred embodiment, a laser 503 is utilized with a laser power supply 505. Other light sources with collimating lenses (not shown) might also be used. The laser beam terminates at a photo cell 506. The photocell 506 is connected to amplifier circuit block 507. A sensitivity adjustment block 508 is included to compensate for the various devices into which the amplified signal from the photo cell might be provided. Such devices can include a microprocessor 509, a transmitter 510 (which may be used as a transmitter 14), manual input device (feedback mechanism) 516, and/or a counter block 511. Manual input device 516 may be used as the additional trap parameter input means 13.

When a flying insect 501 enters into the beam of light 502, a part of the light is extinguished. The photocell 506 detects the lower light intensity. Therefore, the light curtain may be used as a pest monitor or sensor 12. The amplifier circuit block 507 and sensitivity adjustment block 508 provide the pest activity signal to transmitter block 510 (and/or other blocks 509 and 511). The flying insects 501 are attracted by UV lamps 512 or other attractant. The device can operate as a counter alone (e.g., as a pest monitor without a physical trap) or it can operate as a trap. In the latter case, the flying insect may become entangled on a glue or sticky board lying beneath the light curtain 514 and/or become eliminated by electrical discharge device (not shown). A housing 513 mounts the various components of the trap.

A further discussion of a non-destructive flying insect monitor (and optional destructive trap) may be found in the commonly assigned application of the assignee hereof entitled LIGHT EXTINCTION BASED NON-DESTRUCTIVE FLYING INSECT DETECTOR, issued as U.S. Pat. No. 7,071,829 on Jul. 4, 2006, the entire contents of which is incorporated herein by reference.

FIG. 6 illustrates an electrical-discharge insect-control system 550 with an event monitoring circuit 551. The trap 550 kills insects by discharging electricity from a transformer 552 through the insect when it approaches the electrified grid 553. The insect reduces the air gap between the electrodes of the grid, allowing breakdown to occur in the air and electrical current to flow through the insect and air. The current flows during the short period of time in which the insect is in the vicinity of the grid and kills the insect. The trap 550 includes a sensing circuit 551 to monitor for a pest event (e.g., when an insect is in the vicinity of the grid 553). When the current flows, the circuit detects the transient signal as the system is activated and supplies this signal to a counter 554 and/or microprocessor 555 for compilation of event data. This data can then be transmitted by a transmitter device 556 for further analysis. Feedback information may also be supplied for transmission via the feedback device 557 by the user of the system.

Figure 7B:
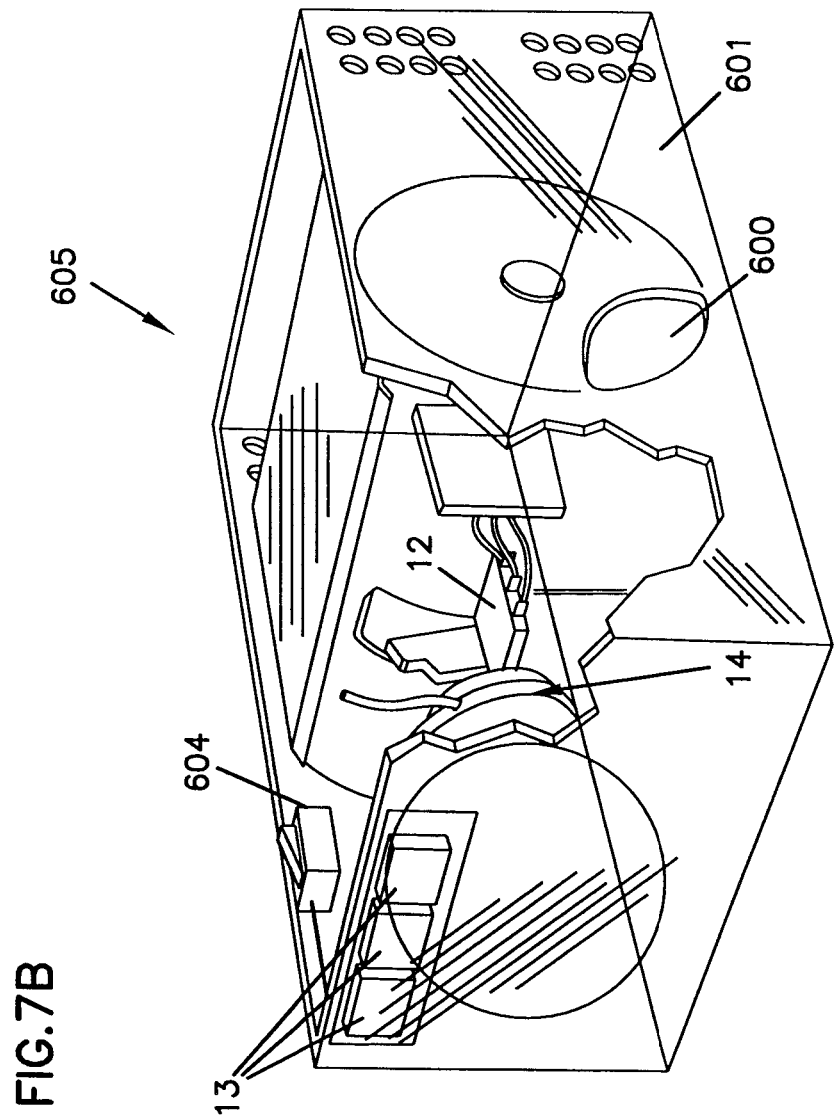
FIG. 7 a illustrates a perspective view with portions broken away of a wind-up type rodent trap constructed in accordance with the principles of the present invention.

FIGS. 7 *a* and 7 *b* illustrate a wind up type rodent trap 605 of the type known in the art. However, additional components including pest activation sensor 12, communication device 14, an optional gross motion sensing switch 603, an optional cover switch 604, and additional trap parameter input means 13 are provided within housing 601 of trap 60. In the preferred embodiment, the sensor 12 is a contact closure switch utilizing mechanical or magnetic action, the communication device 14 is a modified FreshLoc device identified above, and the input means 13 are spring activated contact buttons 13.

Gross motion sensing switch 603 provides information on rough treatment of the trap 605. Examples may include the trap 605 being kicked by an individual or struck by an inanimate object (e.g., a ladder or forklift). Cover switch 604 can provide information on whether the trap has been opened prior to the physical inspection. Such information can explain an empty trap even though a pest detection signal has been generated and a pest event received. This switch can be a mercury type switch, a momentum switch, and other switches which sense physical movement of the trap (or which monitor the physical location of the trap, e.g., a GPS sensor). Switch 604 can take the form of a mechanical switch, photo sensitive switch, magnetic switch, and other devices which are capable of functionally determining if the cover has been opened.

In operation, a mouse or other rodent enters the trap 605 through entrance hole 600 into the rotating trap mechanism 602. The mechanism rotates with the rodent to place the rodent within enclosure 60, but without access back through entrance hole 600. The sensor 12 detects the rotation and triggers a pest activity signal to transmitter 14. This causes transmitter 14 to communicate with receiver 15 that a pest event occurred. During subsequent inspection, additional trap parameter data can be entered through buttons 13.

Figure 8B:
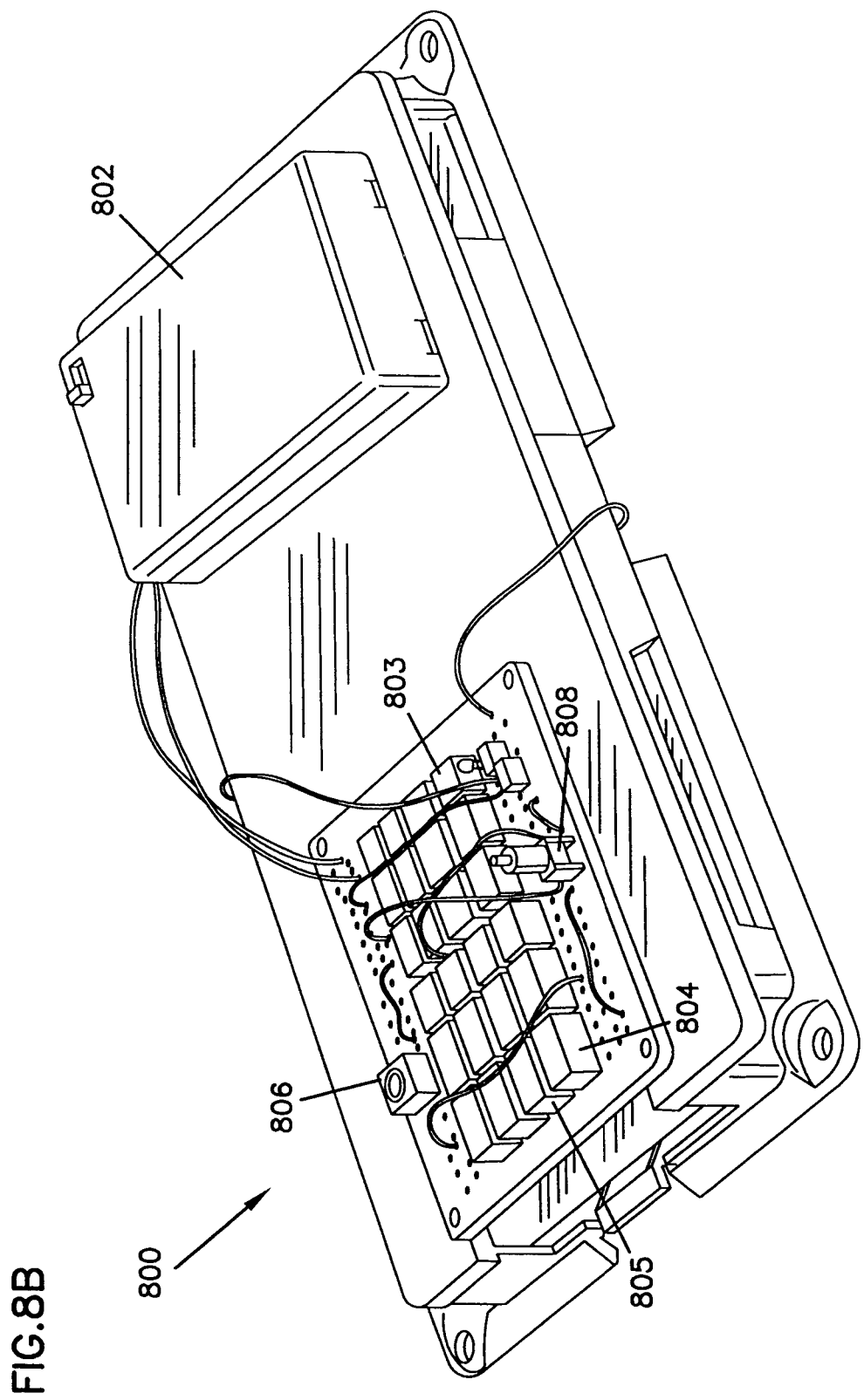
FIG. 8 a illustrates a perspective view of an insect monitor having an electrode grid (and the cover partially removed) constructed in accordance with the principles of the present invention.
Figure 8C:
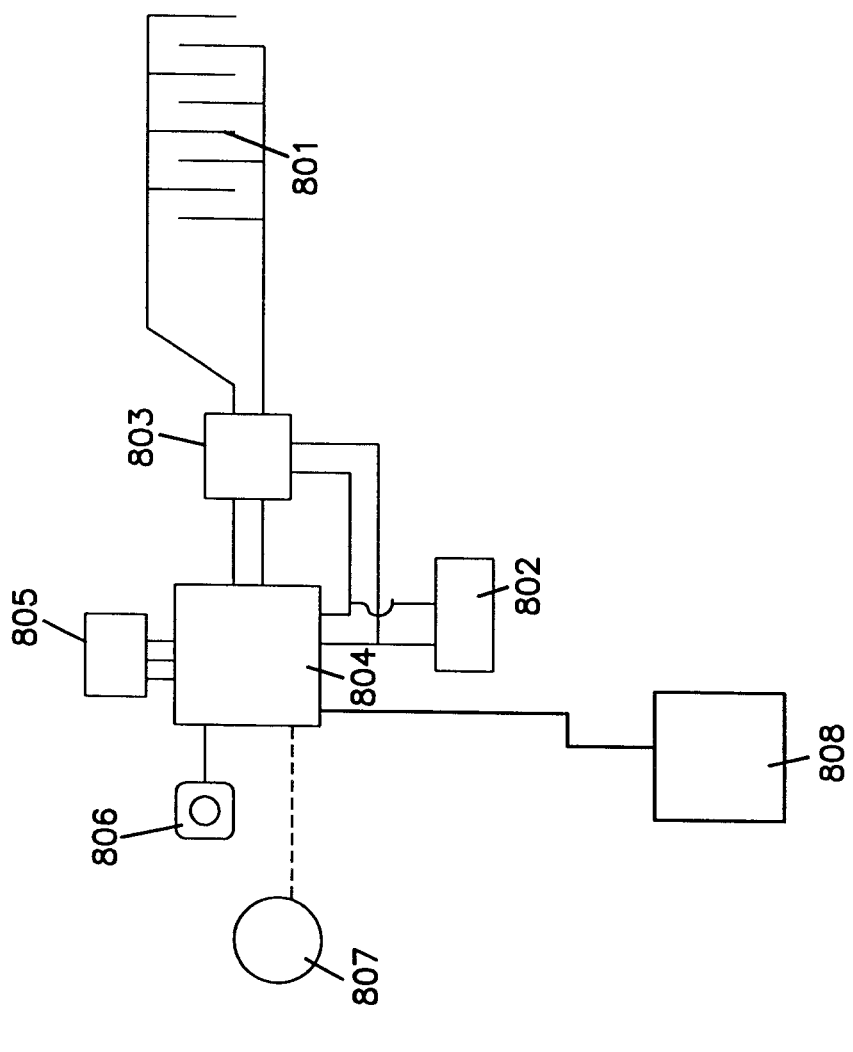

FIGS. 8 *a*-8 *c* illustrate an insect monitor 800 with electrode grid 801. Capacitive sensing block 803 is operatively attached to the grid 801. Power block 802 is connected to the capacitive sensing block 803 and to the microprocessor block 804. Memory block 805 is connected to the microprocessor block 804 (and/or the microprocessor can have its own on board memory; not shown). Switch block 808 is connected to the microprocessor block 804 to provide user feedback input. IR device 806 is provided to enable input and output communication with a PDA 21 or other IR communication device. An RF device 807 may also be connected to microprocessor block 804 to provide RF communication with the monitor 800.

Capacitive sensing block 803 is arranged and configured to detect changes in the capacitive coupling between the electrodes of grid 801. When an insect enters the monitor 800, the insect provides capacitive coupling between the electrodes of the grid 801. The change is sensed by the capacitive sensing chip 803. The time and date of the event is determined by the microprocessor block 804 and may be stored in memory 805 or can be transmitted directly to a computer 16 via RF device 807. If the data is stored in memory block 805, it may be transmitted at a latter time (e.g., in a batch mode) via RF device 807; it can be stored for transmission to a PDA device 21 via IR device 806; and/or it can be transmitted after additional data is entered at manual input device (switch) 808. If RF device 807 provides for two way transmission, the information can also be transmitted after a polling transmission by computer 16 (via receiver block 15).

Prior art devices of this type of monitor are often accomplished by use of glue boards with plastic covers or strategically placed attractants. A limitation of these devices is that a service technician does not have the ability to determine when the activity occurred during the service cycle. The monitor shown in FIGS. 8 *a*-8 *c* allows the comparison not only of activity in multiple monitors but also allows technicians to determine if activity occurred at the same time. An additional limitation of traditional monitors is that technicians can report they visited a monitor without actually having visited the monitor. Therefore, the feedback buttons 808 (best seen in FIG. 8 *c*) insures that the monitor was inspected, as well as documenting the inspection process. A further benefit of the monitor 800 of FIGS. 8 *a*-8 *c* is that the monitor does not have to immobilize the insect to communicate the activity to the inspector. This benefit allows the database 25 to report on the activity in a facility without causing customers or inspectors to view unsightly insects.

A further discussion of the capacitive sensing monitor may be found in the commonly assigned application of the assignee hereof entitled METHOD AND APPARATUS FOR CAPACITIVELY SENSING PESTS, issued as U.S. Pat. No. 6,937,156 on Aug. 30, 2005, the entire contents of which is incorporated herein by reference.

Figure 9A:
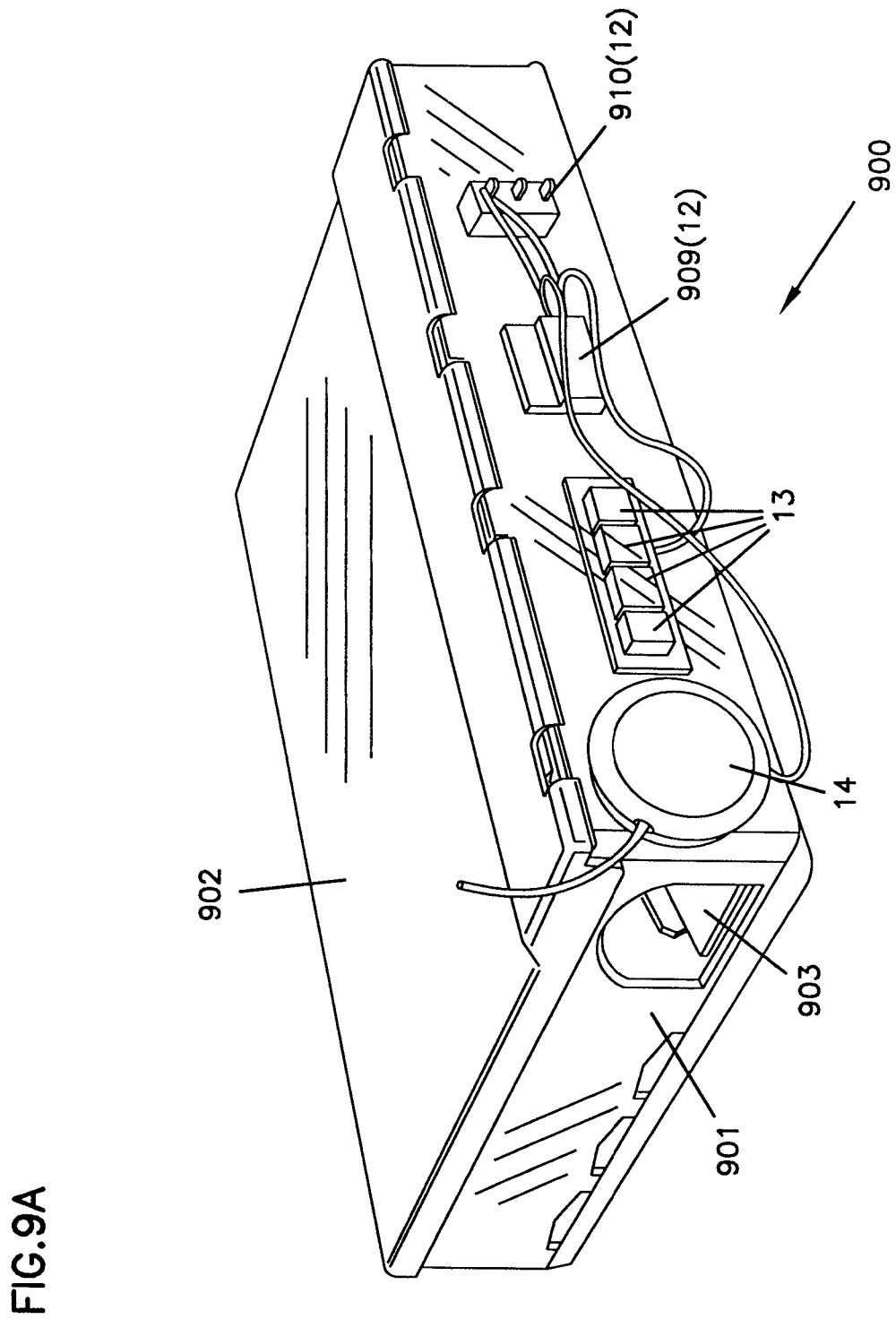
FIG. 9 a illustrates a rear view of a Tin-Cat style rodent trap constructed in accordance with the principles of the present invention.
Figure 9B:
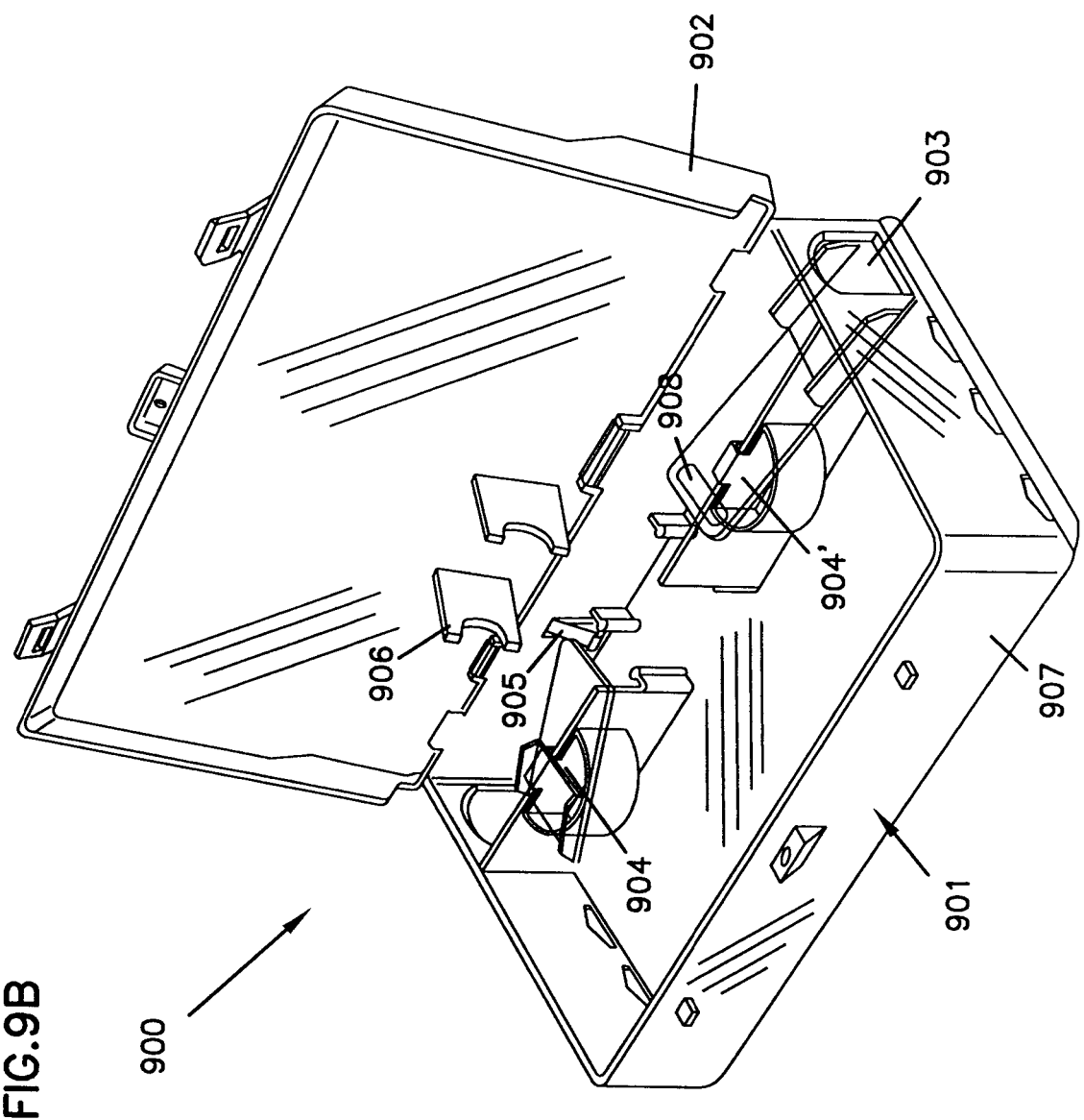

FIGS. 9 *a* and 9 *b* illustrate a rodent trap 900 of the type known in the art as a tin cat style trap. Additional components including pest activation sensor 12, communication device 14, and additional trap parameter input means 13 are provided on the rear of 901 of trap 900. Two different types of sensors are shown on trap 900. Switch 910 is shown on one side of the trap 900. A contact element 905 is shown on the inside of trap housing 901 corresponding to switch 910. Contact element 905 is closed by movement of the first trap mechanism 904. On the other side of trap 900, a magnetic sensor 909 is shown. Magnet 908 resides within housing 901 and passes by the magnetic sensor 909 through movement of the second trap mechanism 904'. In the preferred embodiment, the communication device 14 is a FreshLoc device identified above, and the input means 13 are spring activated contact buttons.

In operation, a mouse or other rodent enters the trap 900 through entrance holes 903 into trap mechanism 904 or 904'. The weight of the rodent lowers the mechanism 904 or 904' closing contact 905 or passing magnet 908 past magnetic sensor 909. The rodent crawls under the lower opening of blocking element 906 and into the trap 900. Once the rodent is off of the mechanism 904 or 904', it springs back up so the rodent cannot exit back through holes 903. Cover 902 is hinged and securely fastens to base 907. The sensor 12 detects the momentary contact of contact 905 or change in magnetic field from magnet 908 and triggers a pest activity or detection signal to transmitter 14. This causes transmitter 14 to communicate with receiver 15 that a pest event occurred. During subsequent inspection, additional trap parameter data can be entered through buttons 13.

It will be appreciated that the principles of this invention apply not only to the types of activity sensing pest devices (including traps and monitors) described herein, but also to the method of collecting pest monitoring and/or trap data, and then providing feedback data based on physical inspections. While particular embodiments of the invention have been described with respect to its application, it will be understood by those skilled in the art that the invention is not limited by such application or embodiment or the particular components disclosed and described herein. It will be appreciated by those skilled in the art that other components that embody the principles of this invention and other applications therefore other than as described herein can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

The invention claimed is:

1. A pest trap reporting system, comprising:
a plurality of pest traps, wherein each pest trap encloses, retains or kills one or more non-human pests;
a pest report database that includes pest activity information for the plurality of pest traps;
a plurality of sensors, each of the plurality of sensors associated with a different one of the plurality of pest traps, wherein each sensor senses pest activity in an area monitored by the respective sensor and generates a pest activity signal that includes pest activity information and pest trap identification information that identifies the pest trap with which the sensor is associated;
a manual input device associated with one or more of the plurality of pest traps and configured to accept manual input when the one or more of the plurality pest traps are inspected, the manual input corresponding to at least one feedback parameter concerning the one or more of the plurality of pest traps; and
a communication device including an RF transmitter and receiver that receives the pest activity signals and the at least one feedback parameter and is configured to communicate the pest activity signals and the at least one feedback parameter to the pest report database, and wherein the pest report database is updated upon receipt of the pest activity signal and the at least one feedback parameter based on the pest trap identification information.

2. The system of claim 1, wherein at least one of the plurality of pest traps includes an electrocution grid.

3. The system of claim 1, wherein at least one of the plurality of pest traps includes a glue board for trapping flying insects.

4. The system, of claim 1, wherein at least one of the plurality of pest traps includes a wind up style mouse trap.

5. The system of claim 1, wherein at least one of the plurality of pest traps includes a tin cat style mouse trap.

6. The system of claim 1, wherein at least one of the plurality of sensors includes a flying insect counter.

7. The system of claim 6, wherein the flying insect counter includes a light beam and a sensor for detecting an intensity of the light beam, wherein when a flying insect flies through the beam, the light intensity decreases and the sensor detects the decreased light intensity as pest activity.

8. The system of claim 1, wherein at least one of the plurality of sensors includes a non-flying bug counter.

9. The system of claim 8, wherein the at least one of the plurality of sensors includes a capacitance grid.

10. The system, of claim 1, wherein the pest activity signal is generated at discrete time intervals.

11. The system of claim 10, wherein the discrete time intervals are short to approximate real time.

12. The system of claim 1, wherein the pest activity signal is generated in real time.

13. The system of claim 1, further including a memory that stores the pest activity signals for batch transmission by the communication device.

14. The system of claim 1, wherein the at least one feedback parameter includes data concerning a condition of at least one of the plurality of pest traps.

15. The system of claim 1, wherein the at least one feedback parameter includes data that indicates that at least one of the plurality of pest traps was physically inspected.

16. The system of claim 1, wherein the manual input device further comprises a plurality of manual input devices, each associated with a different one of the plurality of pest traps and each configured to accept the manual input when the associated one of the plurality of pest traps is inspected, the manual input corresponding to at least one feedback parameter concerning the associated one of the plurality of pest traps.

17. The system of claim 16, wherein the communication device receives the at least one feedback parameter associated with each of the plurality of pest traps and communicates the at least one feedback parameter associated with each of the plurality of pest traps to the pest report database.

18. The system of claim 1, wherein the communication device further comprises a plurality of communication devices, each associated with one of the plurality of pest traps and each including the RF transmitter and receiver that receives the pest activity signals from the associated one of the plurality of sensors and communicates the pest activity signals to the pest report database.

19. The system of claim 1, wherein the at least one feedback parameter includes one of a no activity parameter, an animal found parameter, a trap cleaned parameter, a trap out of place parameter, a trap damaged parameter, a light bulb replaced parameter, a glueboard replaced parameter, or a cover opened parameter.

20. The system of claim 1, wherein the at least one feedback parameter provides data concerning at least one of a false positive, a disturbed trap, or a malfunctioning trap.

21. The system of claim 1, further comprising one or more gross motion sensing switches, each associated with a different one of the plurality of pest traps, each gross motion sensing switch configured to sense information concerning rough treatment of the associated one of the plurality of pest traps.

22. A pest trap reporting system, comprising:
a plurality of pest traps, wherein each pest trap encloses, retains or kills one or more non-human pests;
a pest report database that includes pest activity information for the plurality of pest traps;
a plurality of sensors, each of the plurality of sensors associated with a different one of the plurality of pest traps, wherein each sensor senses pest activity in an area monitored by the respective sensor and generates a pest activity signal that includes pest activity information and pest trap identification information that identifies the pest trap with which the sensor is associated;
a manual input device associated with one or more of the plurality of pest traps and configured to accept manual input when the one or more of the plurality of pest traps are inspected, the manual input corresponding to at least one feedback parameter indicative of whether or not a pest was found in the one or more of the plurality of pest traps; and
a communication device including an RF transmitter and receiver that receives the pest activity signals and the at least one feedback parameter and is configured to communicate the pest activity signals and the at least one feedback parameter to the pest report database, and wherein the pest report database is updated upon receipt of the pest activity signal and the at least one feedback parameter based on the pest trap identification information.

23. A pest trap reporting system, comprising:
a plurality of pest traps, wherein each pest trap encloses, retains or kills one or more non-human pests;
a pest report database that includes pest activity information for the plurality of pest traps;
a plurality of sensors, each of the plurality of sensors associated with a different one of the plurality of pest traps, wherein each sensor senses pest activity in an area monitored by the respective sensor and generates a pest activity signal that includes pest activity information and pest trap identification information that identifies the pest trap with which the sensor is associated;
a manual input device associated with one or more of the plurality of pest traps and configured to receive a feedback code indicative of whether or not a pest was found in the one or more of the plurality of pest traps; and
a communication device including an RF transmitter and receiver that receives the pest activity signals and the feedback code and is configured to communicate the pest activity signals and the feedback code to the pest report database, and wherein the pest report database is updated upon receipt of the pest activity signal and the feedback code based on the pest trap identification information.

24. A pest trap reporting system, comprising:
a plurality of pest traps, wherein each pest trap encloses, retains or kills one or more non-human pests;
a pest report database that includes pest activity information for the plurality of pest traps;
a plurality of sensors, each of the plurality of sensors associated with a different one of the plurality of pest traps, wherein each sensor senses pest activity in an area monitored by the respective sensor and generates a pest activity signal that includes pest activity information and pest trap identification information that identifies the pest trap with which the sensor is associated;
a manual input device associated with one or more of the plurality of pest traps and configured to accept manual input when the one or more of the plurality of pest traps are inspected, the manual input corresponding to at least one feedback parameter concerning the one or more of the plurality of pest traps, wherein the at least one feedback parameter includes one of a parameter indicative that a trap was inspected and no pest was found or a parameter indicative that a trap was inspected and a pest was found; and
a communication device including an RF transmitter and receiver that receives the pest activity signals and the at least one feedback parameter and is configured to communicate the pest activity signals and the at least one feedback parameter to the pest report database, and wherein the pest report database is updated upon receipt of the pest activity signal and the at least one feedback parameter based on the pest trap identification information.

* * * * *